United States Patent

Simmonds et al.

[11] 3,842,303
[45] Oct. 15, 1974

[54] STATOR COIL BRACING

[75] Inventors: Leonard B. Simmonds, Monroeville; Charles R. Ruffing, Pittsburgh, both of Pa.

[73] Assignee: Westinghouse Electric Corporation, Pittsburgh, Pa.

[22] Filed: Apr. 19, 1973

[21] Appl. No.: 352,815

[52] U.S. Cl.................. 310/260, 310/270, 336/197
[51] Int. Cl. ............................................ H02k 3/46
[58] Field of Search ............ 310/260, 270; 336/197

[56] References Cited
UNITED STATES PATENTS

| | | | |
|---|---|---|---|
| 3,156,885 | 11/1964 | Koza................................... | 336/197 |
| 3,648,091 | 3/1972 | Kostin et al........................ | 310/260 |
| 3,665,234 | 5/1972 | Bishop............................... | 310/260 |

*Primary Examiner*—Mark O. Budd
*Attorney, Agent, or Firm*—G. H. Hitelfer

[57] ABSTRACT

A bracing arrangement for supporting end turn portions of conductor bars of a stator coil in a dynamoelectric apparatus. Two bracing members, each a substantially wedge shaped member having a plurality of saw-toothed serrations on the sloping surface thereof, are utilized to provide the bracing. The first and the second wedge-shaped members are utilized in tandem to exert a predetermined force on the end turn portions of the conductor bars of the stator coil. The first wedge-shaped member and the second wedge-shaped member are each radially inserted into the space between adjacent end turn portions of the stator coil with the flat underside of each wedge-shaped member abutting the conductor bars of the stator coil and the saw-toothed serrations of each wedge-shaped member facing each other. The first and the second wedge-shaped members are moved longitudinally against each other thereby engaging the saw-toothed serrations on the first and the second wedge-shaped member. Once the first and second wedge-shaped members are engaged, motion is permitted only in a direction tending to engage a greater number of saw-toothed serrations, but due to the interlocking of the serrations, a regressive motion is prohibited.

7 Claims, 4 Drawing Figures

PATENTED OCT 15 1974 3,842,303

STATOR COIL BRACING

BACKGROUND OF THE INVENTION

1. Field of the Invention

This invention relates to dynamoelectric apparatus, and more particularly, to improved means for bracing and restricting relative movement between conductor bars of a dynamoelectric apparatus, such as a motor or generator.

2. Description of the Prior Art

In the construction of dynamoelectric apparatus, conductor bars comprising a plurality of electrical conductors are disposed in slots, which slots are disposed about the inner circumference of the magnetic core of the dynamoelectric apparatus, with the end turn portions of such conductor bars extending beyond the slots of the magnetic core. The stator conductor bars and the end turn portions thereof are subjected during operation of the apparatus to various mechanical stresses which tend to warp them out of shape or cause them to abrade and contact one with the other. Such forces are especially aggravated by high vibration during operation or during an accidental short circuit of the apparatus. In order to prevent vibration and deformation of the end turns or damage to the insulation thereon, it is the practice in the art to interpose bracing members in the spaces between adjacent end turn portions of the conductor bars.

One method of restricting the movement of such conductor bars is the use of wooden blocks surrounded by a sheet of resin impregnated material, such as polyethylene terephthalate, sold under the trade name "Dacron." The blocks are inserted into the spaces between the conducting bars of the apparatus. The wooden blocks, once inserted between the conducting bars, must be held in place by cord or twine to prevent the blocks from slipping from the space between the conductor bars. Owing to the unavoidable differences in the size and shape of the end turn portions and the slight divergences in the dimensions of the spaces between the end turn portions, the appropriate wooden block must be chosen from one of several sizes and manually inserted between the end turn portions of the stator coil. The blocks must be inserted while the resin impregnated material is still in a pliable state and once inserted the material is permitted to harden. The blocks are then secured in place by turns of twine or cord which surround the blocks and the electrical conductor bars to prevent the blocks from slipping. It is evident that this method is both tedious and expensive.

Another method of spacing and supporting the conductor bars which has been developed by the more recent prior art is the tight fitting of a soft, resin-impregnated material into the spaces between the conductor bars. The resin impregnated material is then hardened. The close contact and tight fit between the resin-impregnated material and the conductor bars of the stator coil provides good support and bracing for the bars. However, this technique has not been found wholly satisfactory since the resin spacers have a tendency to loosen due to the vibration and deforming mechanical forces during operation.

An object of this invention is to provide improved and simplified means for blocking apart and bracing adjacent conductor bars of the stator coil in a dynamoelectric apparatus. A further object of the invention is to provide means of bracing the adjacent conductor bars of the stator coil which is easily installed and which provides a close fitting relationship between the adjacent conductor bars. It is a still further object of the invention to provide bracing means that is easy to install, economical to use, will provide a uniform support between each of the adjacent conductor bars of a stator coil in a dynamoelectric apparatus, and will withstand the high mechanical stresses imposed on the stator conductor bars during operation of the apparatus.

SUMMARY OF THE INVENTION

The present invention discloses improved stator coil bracing means for use in a dynamoelectric apparatus, such as a generator. The bracing means comprises two substantially wedge-shaped members having a plurality of saw-toothed notches extending across the breadth of each wedge-shaped member along the sloped surface thereof. The notches form a plurality of discrete, saw-toothed serrations which extend from the lower edge to the upper edge of the wedge-shaped bracing members. A flange extends from the flat underside portion of the wedge-shaped members and overlaps the adjacent conductor bar to prevent slippage of the wedge-shaped members when installed.

The bracing members are utilized in tandem, each member being inserted radially, with respect to the apparatus axis, into the space between adjacent conducting bars of the stator coil of the dynamoelectric apparatus. The flat underside surface of each wedge-shaped member is disposed so as to abut the lateral surface of the conductor bars, thereby causing the saw-toothed serrations on the sloped surface of the wedge-shaped members to face each other. The wedges are disposed so that the lower edge of the first wedge is in proximity to the lower edge of the second wedge, with the saw-toothed serrations on each wedge facing each other. The flanges extending from the underside of each wedge are disposed so as to overlap the adjacent conductor bar abutting the flat underside of each wedge member. The wedges are then moved longitudinally, with respect to the apparatus axis, against each other, the lower edge of each wedge-shaped member being moved toward the upper edge of the other wedge-shaped member so as to engage a plurality of the saw-toothed serrations on each wedge, one with the other. The wedges are tightened by suitable means, such as an air operated tightening device. The wedges are tightened until a predetermined force perpendicular to the axis of the conductor bars is exerted by the joined wedges on the adjacent conductor bars.

This invention overcomes the aforementioned disadvantages of the prior art. Since the wedges are inserted individually and then tightened to exert a predetermined force on the conductor bars, there is only one size of wedge required for the particular dynamoelectric apparatus class in question, so that there is no need to determine and select the appropriate size from many close sizes as was required in the prior art wooden blocks. The utilization of air pressure or similar tightening means provides rapid engagement of the wedge notches, and accurately provides a predetermined uniform pressure on each of the conductor bars. Since the notches on each of the wedge members interlock, motion can be permitted only in a direction which would cause further tightening of the conductor bars, thus the wedges are unable to regress and loosen during operation.

Since both wedges utilized in the tightening of the conductor bars are identical, and since only one size need be used, they may be molded in quantity from an inexpensive matched metal die mold. The wedges may be fabricated from any non-metallic material having a predetermined dielectric property. Since the wedges are provided with an extending flange portion so as to overlap the adjacent conductor bars, the need for string or twine surrounding the wedges and the conductor bars as utilized in the prior art is no longer necessary.

It is thus seen that this invention provides an inexpensive, easy to install, and accurate method of bracing and supporting the end turn portions of the stator coils of the dynamoelectric apparatus against one another.

BRIEF DESCRIPTION OF THE DRAWING

The invention will be more fully understood from the following detailed description of an illustrative embodiment, taken in connection with the accompanying drawings, in which.

DESCRIPTION OF THE PREFERRED EMBODIMENT

Figure 1:
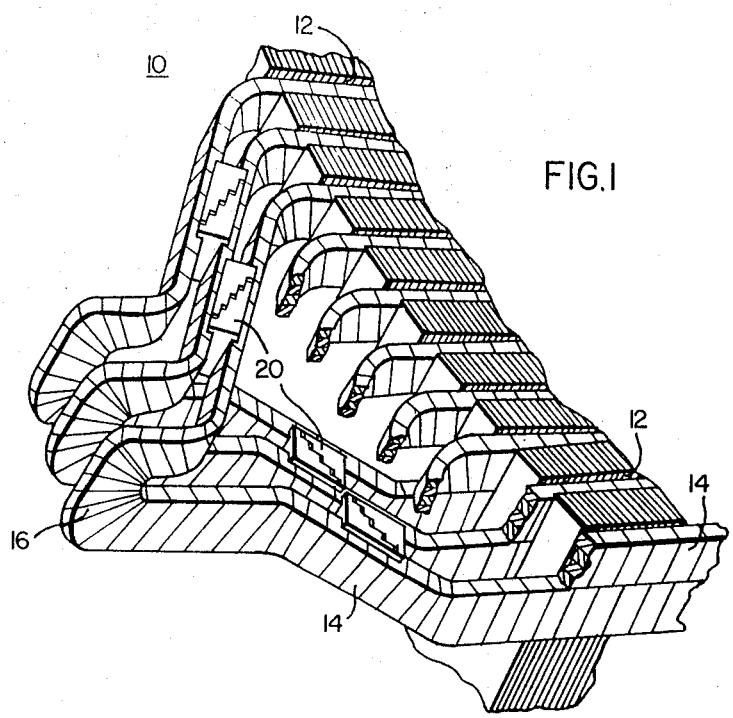
FIG. 1 is a perspective view of a stator of a dynamoelectric apparatus utilizing the teachings of this invention.

Throughout the following description, similar reference characters refer to similar elements in all figures of the drawings.

Referring first to FIG. 1, there is shown a stator assembly 10 for a large dynamoelectric apparatus having the end turn portions of the stator coil conductor bars braced and supported according to the teachings of this invention. The stator assembly 10, fabricated of magnetic material, has a plurality of spaced conductor slots 12 disposed circumferentially about the interior of the stator assembly 10. The conductor slots 12 extend axially through the stator assembly 10. Inserted into each of the plurality of spaced conductor slots 12 is a plurality of electrical conductor bars 14. Each conductor bar 14 has an end turn portion 16 projecting from the conductor slots 12 in the stator assembly 10. The electrical conductor bars 14 are fabricated of a plurality of electrical conductors, surrounded by an insulating material and forming a rigid bar. Since, during the operation of the dynamoelectric apparatus, high vibrational forces and great mechanical stress are imposed upon the end turn portions 16 of the winding conductor bars 14, and since these forces are especially aggravated during short circuit conditions, the winding conductor bars 14 must be spaced and supported against each other to prevent contact of one conductor bar with the other. In the view of the stator assembly 10 illustrated in FIG. 1, bracing means 20 are inserted in the spaces between the adjacent electrical conductor bars 14 to provide the required bracing of the conductor bars 14.

Figure 2:
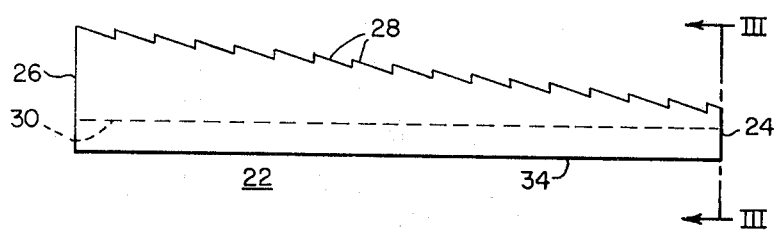
FIG. 2 is an elevational view of one wedge-shaped bracing member utilized in the invention.

Referring now to FIG. 2, an elevational view of a wedge-shaped bracing member 22 utilized in this invention is shown. The bracing means 20 (FIG. 1) comprise a pair of bracing wedges. The bracing wedge 22 has a lower edge 24 and an upper edge 26. The bracing wedge 22 has a plurality of saw-toothed notches 28 on the sloped surface of the wedge 22, the notches 28 thereby providing a plurality of discrete saw-toothed serrations extending across the breadth of the wedge member 22. The serrations 28 extend across the breadth of the bracing wedge 22 from the lower edge 24 to the upper edge 26.

Figure 3:
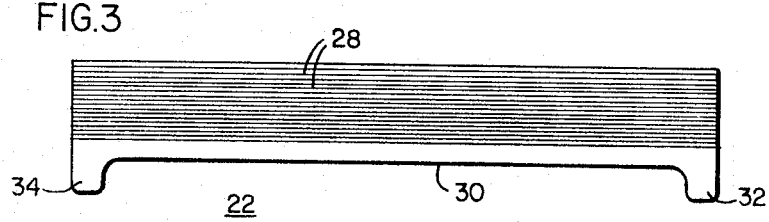
FIG. 3 is a view taken along lines III—III of FIG. 2, showing a wedge-shaped bracing member utilized in the invention; and, FIG. 4 is a perspective view showing, in detail, the location of a pair of wedge-shaped members utilized in the invention.

Referring next to FIG. 3, a view of a wedge 22 utilized in this invention taken along lines III—III of FIG. 2 is shown. The wedge 22 has a flat underside 30 from which extends a first flange portion 32 and a second flange portion 34. The flanges 32 and 34 are utilized to overlap adjacent conductor bars to prevent slippage of the wedges, once the wedges are installed.

Figure 4:
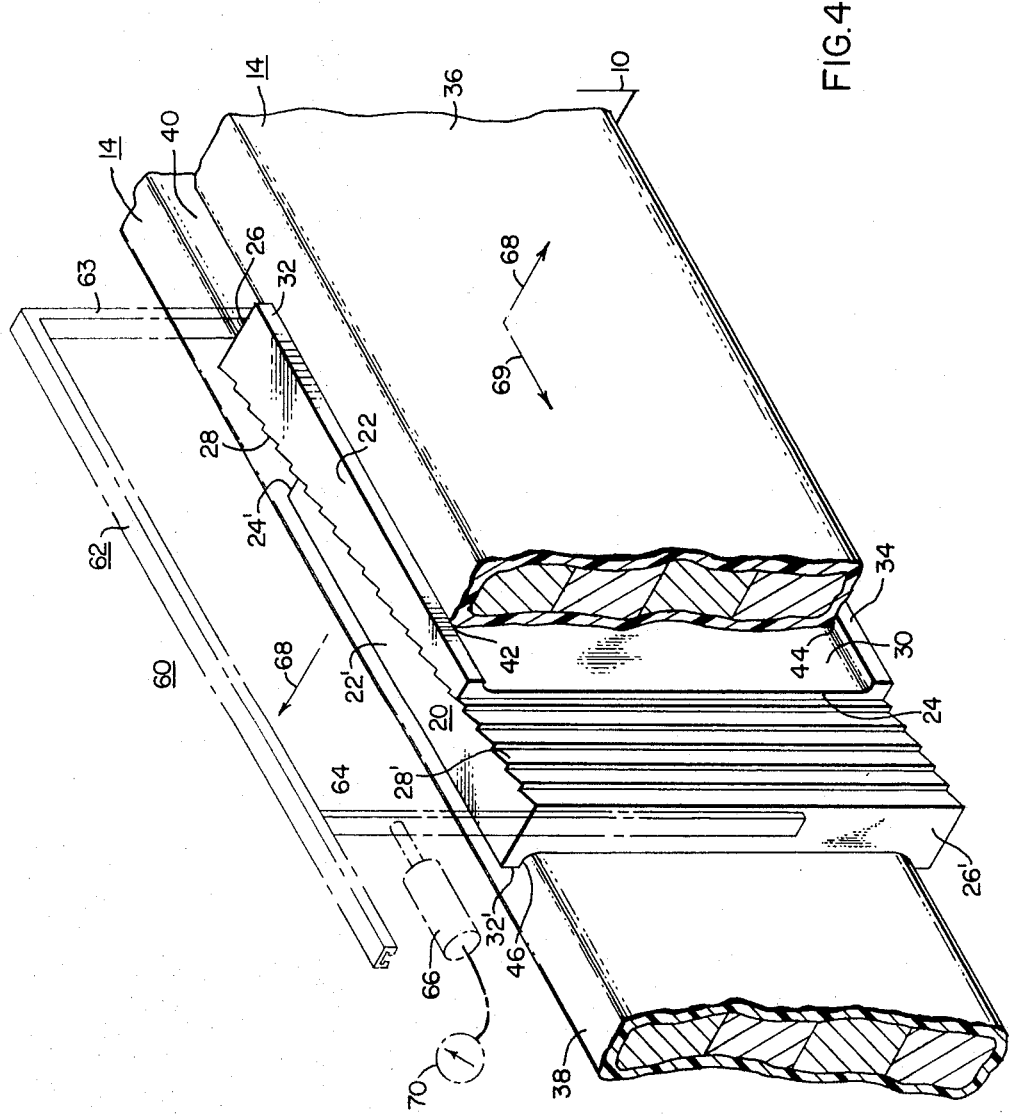

Referring to FIG. 4, a perspective view of installed bracing wedges 22 utilized in the invention is illustrated. In FIG. 4, a view of the end turn portion 16 of two of the electrical conductor bars 14 of the stator 10 are shown. The first electrical conductor bar 36 and the adjacent electrical conductor bar 38 define an interconductor space 40 which lies between the first conductor bar 36 and the second conductor bar 38.

A pair of identical wedges, indicated in FIG. 4 with the reference characters 22 and 22', comprise the bracing means 20 for supporting the electrical conductor bars 36 and 38 against each other. A portion of the first electrical conductor bar 36 is removed for clarity.

The method of installation of the bracing wedges 22 and 22' is as follows. The first wedge 22 is inserted radially with respect to the apparatus axis into the interconductor space 40 so that the flat underside portion 30 of the first wedge 22 is juxtapositioned against the lateral surface of the first conductor bar 36 lying adjacent the interconductor space 40. The flanges 32 and 34 of the first wedge 22 are disposed so as to overlap a portion of the top and bottom of the first conductor bar 36 as illustrated by reference numerals 42 and 44 respectively. By disposing the flat underside portion 30 of the wedge 22 against the first conductor bar 36, the saw-toothed serrations 28 on the first wedge 22 face toward the interconductor space 40.

The second bracing member 22' is similarly inserted, such that the flat underside portion (not shown) of the second bracing member 22' is juxtapositioned against the lateral surface of the second conductor bar 38 lying adjacent the interconductor space 40. The flange portion 32' of the second bracing member 22' overlaps the second conducting bar 38, as illustrated by reference character 46. The second flange on the second wedge 22' is not shown. The lower edge 24 of the first wedge 22 and the lower edge 24' of the second wedge 22' are thus in close proximity to one another. The saw-toothed serrations 28 on the first wedge 22 and the saw-toothed serrations 28' on the second wedge 22' are facing each other.

The conductor bars 36 and 38 are braced against each other by moving the first wedge 22 longitudinally, with respect to the apparatus axis, against the second wedge 22' so that the serrations 28 on the first wedge 22 interlock with the serrations 28' on the second wedge 22'. The first wedge 22 is moved longitudinally against the second wedge 22' so that the lower edge 24 of the first wedge 22 proceeds toward the upper edge 26' of the second wedge 22', while the lower edge 24' of the second wedge 22' proceeds toward the upper edge 26 of the first wedge 22, thus causing the serrations 28 and 28' to interlock.

The interlocking of the serrations 28 and 28' create a self-locking effect so that only longitudinal movements which tend to engage a greater number of serrations 28 and 28' are permitted, while a regressive movement which would tend to release some of the interlocking serrations 28 and 28' is prohibited.

The first wedge 22 and second wedge 22' are moved against each other by use of an air operated tightening device 60. The tightening device 60 has an L-shaped member 62 having a stem 63 thereon and a flat bar member 64 that is movably disposed relative to the L-shaped member 62. The flat bar member 64 is connected to an air cylinder 66 which moves the flat member 64 in a reciprocating fashion toward the stem 63 of the L-shaped member 62 and away from the stem 63 of the L-shaped member 62.

The first wedge 22 and the second wedge 22' are moved against each other until a predetermined pressure P1, indicated by reference numeral 68, is exerted by the joined first wedge 22 and second wedge 22' against the first conductor bar 36 and the second conductor bar 38. The pressure P1 (68) acts in a direction perpendicular to the axis 69 of the conductor bars 36 and 38. The magnitude of P1 (68) can be accurately controlled by control of the tightening pressure 70 exerted by the air pressure tightening device 60. When the tightening pressure 70 reaches a predetermined value, the pressure exerted by the interlocking wedges 22 and 22' on the conductor bars 36 and 38 has reached the predetermined pressure P1 (68) which is to be exerted against the adjacent electrical conductor bars 36 and 38.

In order to prevent rotation of the first wedge 22 and the second wedge 22' in the interconductor space 40 during tightening of the bracing wedges 22 and 22', the members 62 and 64 of the tightening device 60 must extend a substantial radial distance along the higher edge 26 of the first wedge 22 and the higher edge 26' of the second wedge 22'.

Once the first wedge 22 and second wedge 22' have been tightened to exert the predetermined pressure 68, the overlapping flanges 32 and 34 of the first wedge 22 and the flanges of the second wedge 22' prevent the interlocking wedges from slipping radially from their position between the first conductor bar 36 and the second conductor bar 38.

It may be advantageous in certain situations to dispose a piece of resin impregnated fabric, such as polyethylene terephthalate, sold under the trade name "Dacron," on the first and second conductor bars 36 and 38 respectively before the first wedge 22 and the second wedge 22' are inserted into the interconductor space 40. The resin impregnated material, when hardened, provides a further bracing medium in addition to the interlocking and tightening of the first bracing member 22' and the second bracing member 22'.

Since the flanges extending from the wedges 22 and 22' overlap the conductor bars 36 and 38 to prevent radial slippage of the interlocking bracing members, the need for twine or rope as in the prior art to secure the bracing blocks, is no longer required.

It is thus apparent that the invention provides an improved technique for supporting and bracing apart the adjacent conductor bars of the stator coil in a dynamoelectric apparatus so that the conductor bars are able to withstand the high mechanical stresses imposed upon them either during operation or during imposition of a short circuit condition.

Radial insertion of a first and second wedge, each wedge having a plurality of saw-toothed serrations extending across the breadth of the wedge along the sloped surface thereof, and the longitudinal movement of the first wedge against the second wedge so that the serrations interlock, provides an inexpensive, easy-to-install, and accurate method of bracing and supporting the conductor bars of a stator of a dynamoelectric apparatus.

Since the serrations of the first and second wedges interlock, slippage in a direction tending to disengage interlocked serrations is prohibited, thus the first and second wedges will not become loose during operation of the apparatus. The flange portions overlapping the adjacent conductor bars of the stator secure the interlocking wedge members into position, thus eliminating the need for string or twine as was required in the prior art. Tightening of the first and second wedges by the pressure activated tightening means provides an accurate and controllable method of applying a predetermined force normal to the conductor bar axis sufficient to support the conductor bars during operation of the apparatus.

What we claim is:

1. A stator for dynamoelectric apparatus,
said stator having a plurality of spaced coil slots therein, a plurality of electrical conductors disposed in said spaced coil slots, said electrical conductors having spaced end turn portions projecting beyond the ends of said coil slots, and, means for rigidly supporting said end turn portions,
said means comprising a first and a second bracing member disposed in the space between adjacent end turn portions of said electrical conductors, said first bracing member and said second bracing member each having a toothed notch therein,
said first and said second bracing members being displaceable relative to said electrical conductors to engage said notch on said first bracing member with said notch on said second bracing member,
the engagement of said first bracing member and said second bracing member providing a self-locking relationship between said first bracing member and said second bracing member, said first and said second bracing member exerting a predetermined force on the electrical conductors abutting said engaged first bracing member and said second bracing member.

2. A stator for dynamoelectric apparatus,
said stator having a plurality of spaced coil slots therein, a plurality of electrical conductors disposed in said spaced coil slots, said electrical conductors having spaced end turn portions projecting beyond the ends of said coil slots, and means for rigidly supporting said end turn portions, said means comprising a first bracing member and a second bracing member, said first bracing member being a first substantially wedge-shaped member having an inclined surface thereon and a substantially flat surface disposed on the underside of said inclined surface, said first wedge-shaped member having at least one toothed notch extending across the inclined surface thereof, said first wedge-shaped member being disposed in the space between said end turn portions of said adjacent electrical conductors, the flat underside of said first wedge-shaped member being juxtapositioned against one of the adjacent electrical conductors, the flat underside surface of said first wedge-shaped member thereby abutting one of said electrical conductors, said second bracing member having at least one toothed notch therein, the toothed notch on said first wedge-shaped member being engaged with the toothed notch on said second bracing member, the engagement of said first wedge-shaped member and said second bracing member providing a self-locking relationship between said first wedge-shaped member and said second bracing member, said first wedge-shaped member and said second bracing member exerting a predetermined force on the electrical conductors abutting said engaged first wedge-shaped member and said second bracing member.

3. The stator of claim 1, wherein said first and said second bracing members are displaceable in a direction substantially parallel to an axis extending through said adjacent end turn portions of said electrical conductors.

4. The stator of claim 2, wherein said second bracing member comprises a second substantially wedge-shaped member, said second wedge-shaped member having an inclined surface thereon, said second wedge-shaped member having a substantially flat surface disposed on the underside of said inclined surface, said second wedge-shaped member having at least one toothed notch extending across the inclined surface thereof, said second wedge-shaped member being disposed in the space between said end turn portions of said adjacent electrical conductors, the flat underside of said second wedge-shaped member being juxtapositioned against the second of the adjacent electrical conductors, the flat underside surface of said second wedge-shaped member thereby abutting the second of said electrical conductors, the toothed notch on said first wedge-shaped member being engaged with the toothed notch on said second wedge-shaped member, the engagement of said toothed notch on said first wedge-shaped member with the toothed notch on said second wedge-shaped member providing a self-locking relationship between said first wedge-shaped member and said second wedge-shaped member, the engagement of said first wedge-shaped member and said second wedge-shaped member exerting a predetermined force on the electrical conductors abutting said engaged first wedge-shaped member and said second wedge-shaped member.

5. The stator of claim 4, wherein said first wedge-shaped member has a flange portion extending from the flat underside of said first wedge-shaped member, said flange portion overlapping the electrical conductor juxtapositioned against said first wedge-shaped member, and, said second wedge-shaped member has a flange portion extending from the flat underside of said second wedge-shaped member, said flange portion overlapping the electrical conductor juxtapositioned against said second wedge-shaped member.

6. The stator of claim 4, wherein said first wedge-shaped member has a first flange portion and a second flange portion extending from the flat underside of said first wedge-shaped member, said first flange portion and said second flange portion overlapping the electrical conductor juxtapositioned against said first wedge-shaped member, and said second wedge-shaped member has a first flange portion and a second flange portion extending from the flat underside of said second wedge-shaped member, said first flange portion and said second flange portion overlapping the electrical conductor juxtapositioned against said second wedge-shaped member.

7. The stator of claim 4, wherein said first wedge-shaped member has a plurality of toothed notches extending across the inclined surface of said first wedge-shaped member, said notches providing said first wedge-shaped member with a plurality of discrete saw-toothed serrations, and, said second wedge-shaped member has a plurality of toothed notches extending across the inclined surface of said second wedge-shaped member, said notches providing said second wedge-shaped member with a plurality of discrete saw-toothed serrations, the plurality of saw-toothed serrations on said second wedge-shaped member being engaged with the plurality of saw-toothed serrations on said second wedge-shaped member, the engagement of a predetermined number of the plurality of saw-toothed serrations on said first wedge-shaped member and said second wedge-shaped member providing a self-locking relationship between said first wedge-shaped member and said second wedge-shaped member, thereby exerting a predetermined force on the electrical conductors abutting said engaged first wedge-shaped member and said second wedge-shaped member.

* * * * *